June 28, 1966     C. J. SWENDSEN     3,257,971
NON-PROTRUDING CLEAT
Filed June 22, 1964
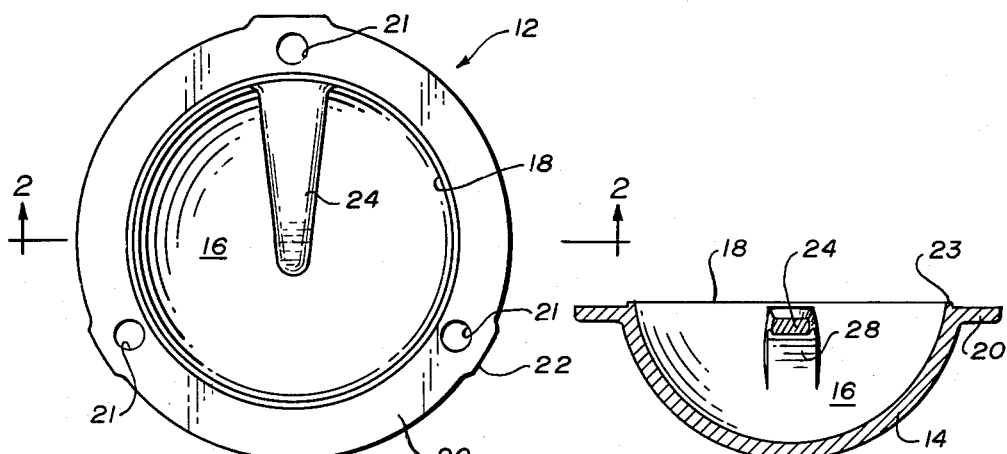
FIG. 1
FIG. 2
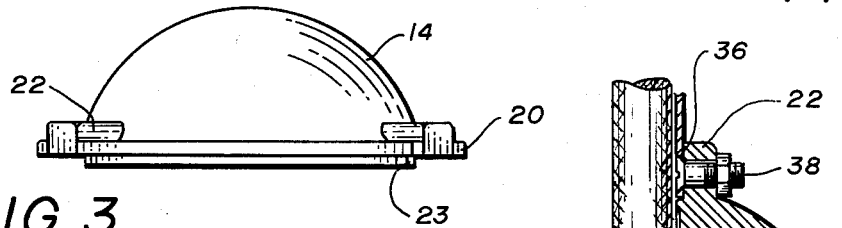
FIG. 3
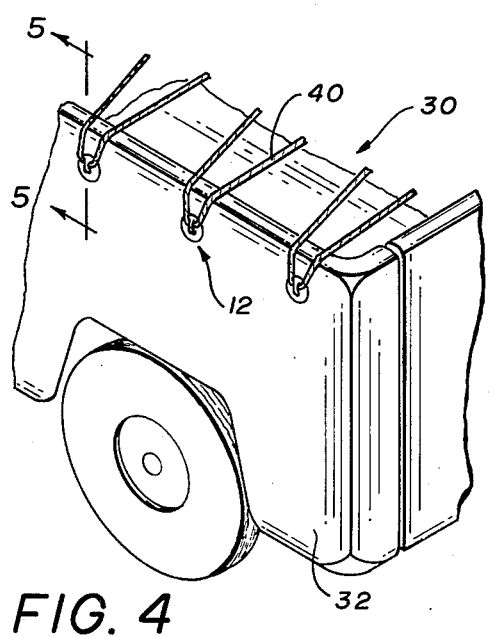
FIG. 4
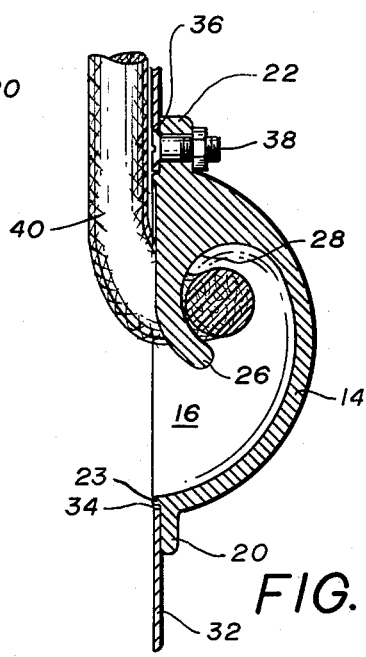
FIG. 5
INVENTOR.
CARL J. SWENDSEN
BY Townsend and Townsend
ATTORNEYS

United States Patent Office 3,257,971
Patented June 28, 1966

3,257,971
NON-PROTRUDING CLEAT
Carl J. Swendsen, Nevada City, Calif., assignor to Swendsen Engineering, Nevada City, Calif., a partnership
Filed June 22, 1964, Ser. No. 376,851
4 Claims. (Cl. 105—369)

This invention relates to a cleat for effecting attachment of a line to a panel. Although the invention has particular application to motor trucks wherein a load is secured in the truck by ropes or chains, the invention is not limited to such use and application.

In order to assure safe arrival of cargo transported in a vehicle it is customary to secure the cargo to the vehicle by ropes, chains, cables and like lines. The present invention provides a cleat or hook for affixing such lines to the vehicle which cleat fulfills the following desiderata: The cleat does not protrude from the surface of the vehicle on which it is mounted, as a consequence of which injury to workmen and to cargo is avoided; the cleat is so constructed that lines may be rapidly removed from and secured to the cleat; the cleat may be expeditiously installed into existing vehicles; and the cleat is relatively inexpensive to produce.

The specific embodiment of my improved cleat which will be described in more detail hereinafter includes, in a unitary structure, a shell that defines a concavity, a hook extending from the shell and lying solely within the concavity and a flange circumscribing the mouth of the concavity to effect attachment of the cleat to a panel of the vehicle. The panel is formed with an opening, in registry with which the device is mounted, and consequently a line may be engaged around the hook through the panel opening. The flange is formed with one or more holes therethrough so that screws, rivets or like fasteners can be passed through matching apertures in the panel to mount the cleat on the panel in registry with the panel opening.

The principal object of the present invention is to provide in a cleat for securing lines to a panel which cleat is flush with the panel surface and does not protrude therefrom. A cleat having such characteristics is obviously safer from the standpoint of injury to workmen and cargo than conventional cleats or hooks which protrude from such panels.

Other objects, features and advantages will be more apparent after referring to the following specification and the accompanying drawings in which:

FIG. 1 is a front elevation view of my improved cleat;
FIG. 2 is a cross-section view taken substantially along line 2—2 of FIG. 1;
FIG. 3 is a bottom view of the cleat of FIG. 1;
FIG. 4 is a perspective view of a portion of a truck bed on which cleats of the present invention are mounted;
FIG. 5 is a cross-section view taken substantially along line 5—5 of FIG. 4 showing a line engaged in the cleat.

Referring more particularly to the drawing, reference numeral 12 generally indicates the cleat of the present invention which cleat may be seen to include a wall 14 defining a concavity 16 that terminates in an open mouth 18. Circumscribing wall 14 and extending exteriorly of mouth 18 is a flange 20 defining one or more holes 21 therein for mounting the structure in a panel opening. Flange 20 is formed with portions 22 of greater thickness surrounding holes 21 for reinforcing the holes. A lip 23 circumscribes mouth 18 and extends from flange 20 by an amount approximately equal to the thickness of the panel. Secured to wall 14 within concavity 16 and adjacent mouth 18 is a hook 24 which extends radially inwardly of mouth 18 where it terminates approximately centrally of the mouth in a turned in portion 26 that extends towards wall 14. It will be noted that the extremity of hook 24 is spaced from wall 14 so as to permit insertion of a line therebetween. As may be seen most clearly in FIG. 5 the inner surface 28 of hook 24 is formed as a convoluted continuation of the surface of concavity 16, so that a smooth line engaging surface is established.

In one cleat constructed in accordance with my invention, aluminum was cast to form the entire structure in a unitary manner. Concavity 16 in such exemplary embodiment is hemispherical, and mouth 18 is circular, having a diameter of approximately 2⅜ inches. Extremity 26 of hook 24 is spaced from the surface of concavity 16 by an amount sufficient to afford insertion behind the hook of a rope of approximately ½ inch in diameter. Such hook is particularly suited for installation on the side panels of the bed of a pickup truck.

Referring now to FIG. 4 there is shown the rear portion of a bed 30 of a pickup truck. In a conventional manner side panels 32 of the bed extend upwardly from a truck frame (not shown) to define the bed. Panels 32 are typically formed of steel having a thickness of approximately 1/16 inch more or less. A plurality of cleats 12 are installed on one surface of panel 32 in registry with opening 34 in the panel which opening is concentric with mouth 18 and congruent to the outer periphery of lip 23. Transpiercing panel 32 adjacent openings 34 are screw holes 36 spaced in registry with holes 21 in flange 20. A threaded fastener 38 is passed through holes 36 and hole 21 to fix cleat 12 to the rear or inner surface of panel 32.

As shown more clearly in FIG. 5 a line 40 extends along the outer surface of panel 32 through hole 34 in the panel, around hook 24, and out of concavity 16. The line is therefore securely engaged to truck bed 30 as a consequence of which cargo is secured in the truck bed. Moreover as can best be seen in FIG. 5, no protrusion from panel 32 is created as a result of which the clothing of workmen will not engage any obstructions. It will be understood that the present hook can be mounted facing the inner surface of the vehicle bed 30, and in such position has the advantage that the cargo, particularly during loading and unloading thereof, will not be damaged by engagement with any protruding sharp hooks or the like.

Thus it will be seen that I have provided a cleat that is mounted flush to a panel surface, to which cleat lines for securing cargo can be readily attached.

While one embodiment of the present invention has been shown and described it will be apparent that other adaptations and modifications can be made without departing from the true spirit and scope of the invention.

I claim:
1. An article of manufacture mountable on a panel having a front and rear face and a circular opening therethrough to afford attachment of a line approaching said opening along said front face comprising: a wall defining a hemispherical concavity that terminates in a circular mouth substantially congruent with said opening; a flange circumscribing said mouth and defining at least one aperture for mounting said article on said rear panel face with said mouth in registry with the panel opening; and a hook extending from said wall adjacent said mouth toward the center of said mouth, said hook having an inner termination extending inwardly of said mouth toward said concavity in spaced apart relation to said wall to permit insertion of the line around said hook.

2. An article of manufacture mountable on an apertured panel to define a cleat for securing a line with respect to said panel comprising: a wall defining a substantially hemispherical concavity, said concavity terminating in a substantially circular mouth; means for securing said wall to said panel with the concavity in registry with and accessible through an aperture in said panel; a hook secured to said wall and extending radially inwardly of said mouth, said hook terminating approximately centrally of said mouth in a portion turned in toward said concavity and spaced from said wall by an amount sufficient to permit insertion of said line between said turned in hook portion and said wall; and a lip circumscribing said mouth, said lip having an inner surface continuous with said concavity and an outer surface substantially congruent with the panel aperture, said lip projecting from said mouth by an amount substantially equal to the thickness of the panel.

3. An article of manufacture comprising: a wall defining a substantially hemispherical concavity, said concavity terminating in a substantially circular mouth, a hook secured to said wall and extending radially inwardly of said mouth, said hook terminating approximately centrally of said mouth in a portion turned in toward said concavity and spaced apart therefrom, and a mounting flange extending from said wall exterior of said concavity, said flange being spaced rearwardly of said mouth by an amount sufficient to define a lip circumscribing said mouth, whereby said article can be mounted to a panel having a thickness approximately equal to the height of said lip and an aperture congruent with the outer diameter of said lip so that said hook is accessible through the panel aperture to afford attachment of a line thereto when said article is mounted on the panel in alignment with the hole.

4. In combination with a panel having a front and rear face and a circular opening therethrough an improved article of manufacture for effecting attachment of a line with respect to said panel comprising: a wall defining a substantially hemispherical concavity, said concavity terminating in a substantially circular mouth; a hook secured to said wall and extending radially inwardly of said mouth, said hook terminating approximately centrally of said mouth in a portion turned in toward said concavity and spaced apart therefrom; a mounting flange formed integrally of said wall and exterior of said concavity; means for attaching said flange to said panel so that the mouth of said concavity is in substantial registry with the panel opening; and a lip circumscribing said mouth and extending therefrom into said panel opening, said lip having a forward extremity substantially coplanar with said front panel face and an outer diameter substantially equal to that of the panel opening.

References Cited by the Examiner
UNITED STATES PATENTS

| | | | |
|---|---|---|---|
| 366,971 | 7/1887 | Michaelis | 24—129 |
| 2,046,855 | 7/1936 | Tobin. | |
| 2,505,883 | 5/1950 | Chevalier. | |
| 2,753,816 | 7/1956 | Oakley | 105—369 |
| 2,919,663 | 1/1960 | Neuhart | 105—369 |
| 3,125,966 | 3/1964 | Johnson | 105—369 |

WILLIAM FELDMAN, *Primary Examiner.*

BERNARD A. GELAK, *Examiner.*